United States Patent
Mansfield et al.

(10) Patent No.: US 6,591,693 B1
(45) Date of Patent: Jul. 15, 2003

(54) UNIVERSAL INPUT TO DC OUTPUT CONVERSION CIRCUITRY

(75) Inventors: William M. Mansfield, Lafayette, CO (US); William Harris, Jr., Berthoud, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/540,660

(22) Filed: Mar. 31, 2000

(65) Prior Publication Data (65)

(51) Int. Cl.[7] ............................................ G01F 1/84
(52) U.S. Cl. ............................................ 73/861.356
(58) Field of Search ........................ 73/861.354, 861.356

(56) References Cited

U.S. PATENT DOCUMENTS

| | | | | |
|---|---|---|---|---|
| 3,564,243 A | * | 2/1971 | Takao et al. | 378/106 |
| 4,852,410 A | * | 8/1989 | Corworn et al. | 73/861.38 |
| 5,077,486 A | | 12/1991 | Marson et al. | |
| 5,095,416 A | * | 3/1992 | Ohms | 363/97 |
| 5,481,449 A | | 1/1996 | Kheraluwala et al. | |
| 5,636,106 A | | 6/1997 | Batarseh et al. | |
| 5,701,243 A | * | 12/1997 | Youn et al. | 363/89 |
| 5,767,665 A | * | 6/1998 | Morita et al. | 324/76.52 |
| 5,771,160 A | | 6/1998 | Seong | |
| 5,790,392 A | | 8/1998 | Eklund et al. | |
| 5,804,742 A | * | 9/1998 | Rademacher-Dubbick | 73/861.357 |
| 6,002,103 A | | 12/1999 | Thommes | |
| 6,181,084 B1 | * | 1/2001 | Lau | 315/291 |
| 6,226,195 B1 | * | 5/2001 | Mansfiled | |

* cited by examiner

*Primary Examiner*—Max Noori
(74) *Attorney, Agent, or Firm*—Duft Setter Ollila & Bornsen

(57) ABSTRACT

A circuit for supplying a DC output of a desired voltage from an input regardless of power received. In this circuit, a rectifier converts an alternating current (AC) input to direct current (DC) or changes a DC input to a desired polarity. A boost converter receives DC current having a first voltage from the rectifier and outputs DC current having at least a minimal voltage. Finally, a buck boost converter receives the DC current having at least the minimal voltage and outputs DC having a desired voltage.

18 Claims, 2 Drawing Sheets

UNIVERSAL INPUT TO DC OUTPUT CONVERSION CIRCUITRY

FIELD OF THE INVENTION

This invention relates to circuitry that provides a Direct Current (DC) of a constant voltage to a load. More particularly, this invention relates to circuitry that receives either Alternating Current (AC) and DC of varying voltages from a power source and outputs DC of a constant voltage. Still more particularly, this invention relates to a circuit that receives power from an AC or a DC source and provides DC of a constant voltage of a constant voltage to a signal conditioner in meter electronics of a Coriolis flowmeter.

Problem

It is a problem that different countries, even in different regions of countries, that electricity may be delivered in different manners and at different voltages. Some countries may provide DC electricity and other may provide AC electricity. The problem becomes exasperated when wiring in different facilities deliver electricity in different manners and voltages.

Manufacturers of electronic components that are shipped throughout the world are constantly looking for ways in which to provide electricity of a constant current and voltage to a load. The ability to provide a constant current and voltage to a load would save substantial development and manufacture time as one power supply would be used for the component.

One device in which this is a particular problem is a Coriolis flowmeter. A Coriolis mass flowmeter measures mass flow and other information of materials flowing through a conduit in the flowmeter. Exemplary Coriolis flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters have one or more conduits of straight or curved configuration. Each conduit configuration in a Coriolis mass flowmeter has a set of natural vibration modes, which may be of a simple bending, torsional or coupled type. Each conduit is driven to oscillate at resonance in one of these natural modes. Material flows into the flowmeter from a connected pipeline on the inlet side of the flowmeter, is directed through the conduit or conduits, and exits the flowmeter through the outlet side of the flowmeter. The natural vibration modes of the vibrating, material filled system are defined in part by the combined mass of the conduits and the material flowing within the conduits.

When there is no flow through the flowmeter, all points along the conduit oscillate due to an applied driver force with identical phase or small initial fixed phase offset which can be corrected. As material begins to flow, Coriolis forces cause each point along the conduit to have a different phase. The phase on the inlet side of the conduit lags the driver, while the phase on the outlet side of the conduit leads the driver. Pick-off sensors on the conduit(s) produce sinusoidal signals representative of the motion of the conduit(s). Signals output from the pick-off sensors are processed to determine the phase difference between the pick-off sensors. The phase difference between two pick-off sensor signals is proportional to the mass flow rate of material through the conduit(s).

Meter electronics in the Coriolis flowmeter provide a drive signal to a driver as well as processing signals from the pick-off sensors to determine mass flow rates and other properties of a material. Manufacturers of Coriolis flowmeters such as Micro Motion Inc. of Boulder, Colo. USA sell Coriolis flowmeters to users in various countries throughout the world and desire a circuit for providing power to the meter electronics that provides a DC current that has a constant voltage regardless of power source.

Solution

The above and other problems are solved and an advance in the art by power supply circuit that outputs a DC of a constant voltage from an input of either AC or DC at any voltage. One advantage of this invention is that only one power supply circuit must be placed in manufactured component no matter where the component is being used. This decreases the development time for a component as well as reducing the manufacturing costs of the component.

In accordance with this invention, a circuit for supplying a DC output of a desired voltage from an input regardless of the power source includes the following components. A rectifier receives an input current and converts an alternating current (AC) input to direct current (DC) or changes a DC input to a desired polarity. A boost converter receives DC current from the rectifier and outputs current having at least a minimal voltage. The DC current received from the rectifier has an unknown voltage and the boost converter simply boosts the voltage to a minimal level if the current does not have that minimal voltage. A second boost convertor called a buck boost convertor receives the DC current having at least the minimal voltage and outputs DC having a desired voltage.

The circuit may also include a transformer that provides a galvanic barrier between the buck booster and a load. The galvanic barrier prevents excess current, voltage, or power from being applied to the load. The circuit may also include an output rectifier that prevents excess current from being applied to the load. An opto-coupled feedback may be connected to the output rectifier. The opto-coupled feedback provides a signal to a buck boost feedback control that regulates current output from the buck-booster converter.

The circuit may also include control circuitry that maintains the at minimal output voltage of current output by the boost converter. The circuit may also include start-up circuitry regulates voltage applied to said control circuitry.

DESCRIPTION OF THE DRAWINGS

The above and other advantages of this invention are described in the detailed description and the following drawings.

DETAILED DESCRIPTION

Figure 1:
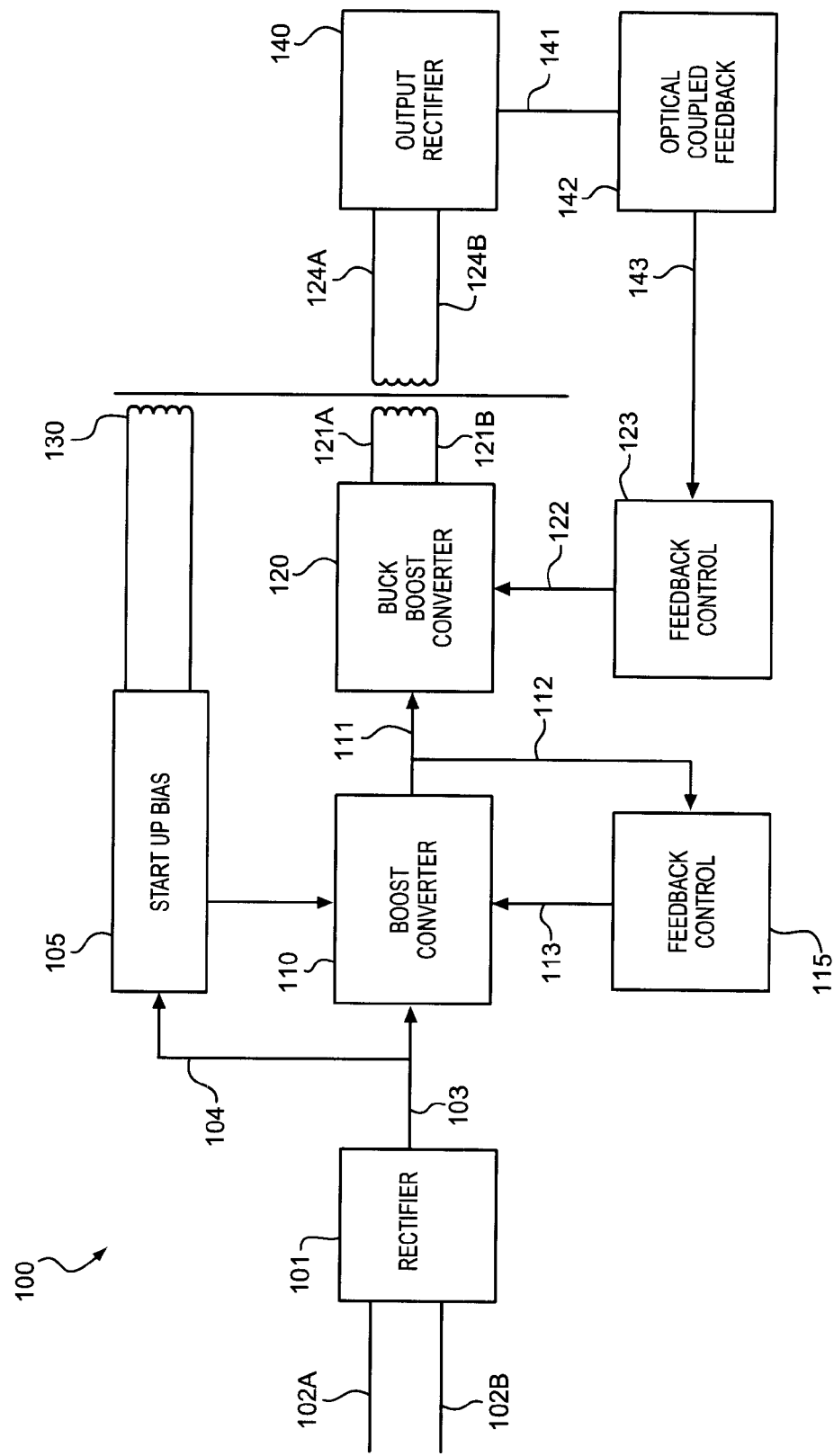
FIG. 1 illustrates circuitry for a power supply in accordance with the present invention.

FIG. 1 illustrates a power supply circuit 100 in accordance with this invention. Power supply 100 may receive either AC or DC input current at any voltage up to a maximum voltage and output DC at a desired voltage. This allows the same power supply to be used to supply loads regardless of where in the world that the load is being sold.

Power supply has a rectifier 101 that receives input current over paths 102A and 102B. The input current may be either AC or DC and may have any voltage. Rectifier 101 is a conventional rectifier that converts an AC current to DC current and changes the polarity of a DC current if needed. A benefit of rectifier 101 is the DC may be applied in either polarity. A DC current having a proper polarity and same input voltage is applied by rectifier 101 to path 103.

Boost convertor 110 receives the DC current applied to path 103 and boosts the voltage of the DC current to at least a minimal value. Boost convertor 110 is a conventional booster. If the voltage of the DC current is greater than the minimal voltage, the DC current passes through boost convertor 110 unchanged.

DC output from boost convertor 110 is applied to path 111. Buck boost convertor receives DC applied to path 111. Buck boost convertor receives the DC and either boosts the DC to a desired voltage or limits the DC to a desired voltage. Buck boost convertor 120 may be a conventional SEPIC booster. DC with the desired voltage is then output over paths 121A and 121B.

A transformer 130 may be coupled to the output of buck booster convertor 120. The transformer 130 provides a galvanic barrier between the power supply 100 and a load (Not Shown). The galvanic barrier prevents excess current, voltage, or power from being applied to the load. This is critical when power supply 100 is providing DC to an intrinsically safe load which is a load that does not have sufficient energy to cause a spark or generate heat that could ignite a volatile material.

DC over transformer 130 is applied to paths 124A and 124B. DC on paths 124A and 124B may be applied to output rectifier/filter 140 which prevents any excess current from being applied to the load (Not shown). DC current is then output from output rectifier/filter 140 and applied to the load.

DC from output rectifier/filter 140 may also be applied to path 141. Optical coupled feedback 142 receives the DC from path 141, generates an optical signal indicating the DC, and transmits the signal to feedback control 123. Feedback control 123 is a conventional feedback loop circuit that regulates the DC voltage of buck boost convertor 120 via path 122. Feedback control 115 is a conventional feedback loop circuit that receives DC output from boost convertor 110 via path 112 and controls the voltage output via path 113.

Start-up bias circuitry 105 receives DC from rectifier 101. Start-up bias circuitry limits voltage and current applied to control circuitry 115 and 123. When power is initially applied start-up bias circuitry allows only a controlled amount of circuitry to be applied to control circuitry 115 and 123 to begin operations at the desired levels.

Figure 2:
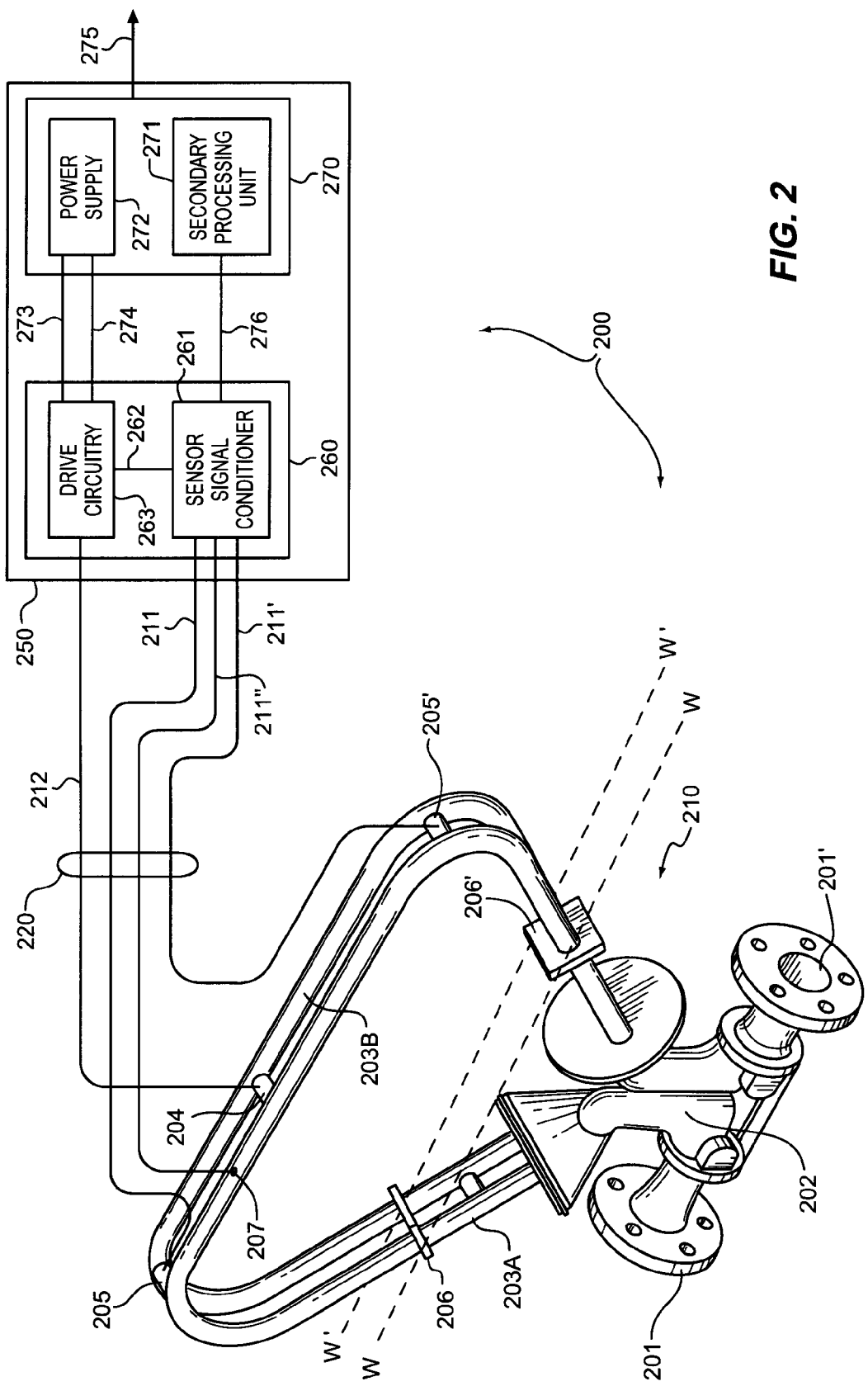
FIG. 2 illustrates a Coriolis flowmeter that incorporates a circuit for a power supply operating in accordance with this invention.

FIG. 2 illustrates a Coriolis flowmeter 200 that incorporates power supply 100 in accordance with the present invention into meter electronics 250. Coriolis flowmeter 200 includes a flowmeter assembly 210 and meter electronics 250. Meter electronics 250 are connected to a meter assembly 210 via leads 220 to provide for example, but not limited to, density, mass-flow-rate, volume-flow-rate, and totalized mass-flow rate information over a path 275. A Coriolis flowmeter structure is described although it should be apparent to those skilled in the art that the present invention could be practiced in conjunction with any apparatus having loads require currents of alternating voltage.

A Coriolis flowmeter structure is described although it should be apparent to those skilled in the art that the present invention could be practiced in conjunction with any apparatus having a vibrating conduit to measure properties of material flowing through the conduit. A second example of such an apparatus is a vibrating tube densitometer which does not have the additional measurement capability provided by a Coriolis mass flowmeters.

Meter assembly 210 includes a pair of flanges 201 and 201' manifold 202 and conduits 203A and 203B. Driver 204, pick-off sensors 205 and 205', and temperature sensor 207 are connected to conduits 203A and 203B. Brace bars 206 and 206' serve to define the axis W and W' about which each conduit oscillates.

When Coriolis flowmeter 200 is inserted into a pipeline system (not shown) which carries the process material that is being measured, material enters flowmeter assembly 210 through flange 201, passes through manifold 202 where the material is directed to enter conduits 203A and 203B. The material then flows through conduits 203A and 203B and back into manifold 202 from where it exits meter assembly 210 through flange 201'.

Conduits 203A and 203B are selected and appropriately mounted to the manifold 202 so as to have substantially the same mass distribution, moments of inertia and elastic modules about bending axes W—W and W'—W', respectively. The conduits 203A–203B extend outwardly from the manifold in an essentially parallel fashion.

Conduits 203A–203B are driven by driver 204 in opposite directions about their respective bending axes W and W' and at what is termed the first out of phase bending mode of the flowmeter. Driver 204 may comprise any one of many well known arrangements, such as a magnet mounted to conduit 203A and an opposing coil mounted to conduit 203B and through which an alternating current is passed for vibrating both conduits. A suitable drive signal is applied by meter electronics 250 to driver 204 via path 212.

Pick-off sensors 205 and 205' are affixed to at least one of conduits 203A and 203B on opposing ends of the conduit to measure oscillation of the conduits. As the conduit 203A–203B vibrates, pick-off sensors 205–205' generate a first pick-off signal and a second pick-off signal. The first and second pick-off signals are applied to paths 211 and 211'. The driver velocity signal is applied to path 212.

Temperature sensor 207 is affixed to at least one conduit 203A and/or 203B. Temperature sensor 207 measures the temperature of the conduit in order to modify equations for the temperature of the system. Path 211" carries temperature signals from temperature sensor 207 to meter electronics 250.

Meter electronics 250 receives the first and second pick-off signals appearing on paths 211 and 211', respectively. Meter electronics 250 processes the first and second velocity signals to compute the mass flow rate, the density, or other property of the material passing through flowmeter assembly 210. This computed information is applied by meter electronics 250 over path 275 to a utilization means (not shown). It is known to those skilled in the art that Coriolis flowmeter 200 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the conduit to vibrate. Vibrating tube densitometers typically utilize only single feedback signal since a density measurement requires only the measurement of frequency and a phase measurement is not necessary. The descriptions of the present invention herein apply equally to vibrating tube densitometers.

In Coriolis flowmeter 200, the meter electronics 250 are physically divided into 2 components a host system 270 and a signal conditioner 260. In conventional meter electronics, these components are housed in one unit.

Signal conditioner 260 includes drive circuitry 263 and pick-off conditioning circuitry 261. One skilled in the art will recognize that in actuality drive circuitry 263 and pick-off conditioning circuitry 261 may be separate analog circuits or may be separate functions provided by a digital signal processor or other digital components. Drive circuitry 263 generates a drive signal and applies an alternating drive current to driver 204 via path 212 of path 220.

In actuality, path 212 is a first and a second lead. Drive circuitry 263 is communicatively connected to pick-off signal conditioning circuitry 261 via path 262. Path 262 allows drive circuitry to monitor the incoming pick-off signals to adjust the drive signal. Power to operate drive circuitry 263 and pick-off signal conditioning circuitry 261 is supplied from host system 270 via a first wire 273 and a second wire 274. First wire 273 and second wire 274 may be a part of a conventional 2-wire, 4-wire cable, or a portion of a multi-pair cable.

Pick-off signal conditioning circuitry 261 receives input signals from first pick-off 205, second pick-off 205', and temperature sensor 207 via paths 211, 211 ' and 211". Pick-off circuitry 261 determines the frequency of the pick-off signals and may also determine properties of a material flowing through conduits 203A–203B. After the frequency of the input signals from pick-off sensors 205–205' and properties of the material are determined, parameter signals carrying this information are generated and transmitted to a secondary processing unit 271 in host system 270 via path 276. In a preferred embodiment, path 276 includes 2 leads. However, one skilled in the art will recognize that path 276 may be carried over first wire 273 and second wire 274 or over any other number of wires.

Host system 270 includes a power supply 272 and processing system 271. Power supply 272 receives electricity from a source and converts the received electricity to the proper power needed by the system. Power supply 272 may incorporate power supply circuit 100 (FIG. 1) in accordance with this invention to provide DC current of a desire voltage to flowmeter 200 regardless of whether the input current is AC or DC and the voltage of the input current. Processing system 271 receives the parameter signals from pick-off signal conditioning circuitry 261 and then may perform processes needed to provide properties of the material flowing through conduits 203A–203B needed by a user. Such properties may include but are not limited to density, mass flow rate, and volumetric flow rate.

What is claimed is:

1. A direct current supply circuit for supplying a direct current (DC) output, comprising:
    a rectifier configured to receive an alternating current (AC) input and convert said AC input to a first direct current (DC) signal, and receive a DC input and convert said DC input to said first DC signal having a desired polarity;
    a boost converter configured to receive said first DC signal having a first voltage, boost said first voltage to at least a minimal voltage if said first voltage is less than said minimal voltage to output a second DC signal having said at least minimal voltage, and maintain said first voltage if said first voltage is greater than said minimal voltage to output said second DC signal having said first voltage; and
    a buck boost converter configured to receive said second DC signal, boost or limit a second voltage of said second DC signal to a desired voltage, and output said DC output having said desired voltage.

2. The circuit of claim 1 further comprising:
    a transformer configured to provide a galvanic barrier between said buck boost converter and a load.

3. The circuit of claim 2 further comprising:
    an output rectifier configured to prevent the supply of excess current from said circuit.

4. The circuit of claim 3 further comprising:
    an opto-coupled feedback connected to said output rectifier; and
    a buck boost feedback control configured to regulate current output from said buck boost converter.

5. The circuit of claim 1 further comprising:
    control circuitry configured to maintain said at least minimal voltage of said second DC signal output by said boost converter.

6. The circuit of claim 5 further comprising:
    start-up circuitry configured to regulate voltage applied to said control circuitry.

7. Meter electronics of a Coriolis flowmeter having a circuit for supplying a direct current (DC) output, said circuit comprising:
    a rectifier configured to receive an alternating current (AC) input and convert said AC input to a first direct current (DC) signal, and receive a DC input and convert said DC input to said first DC signal having a desired polarity;
    a boost converter configured to receive said first DC signal having a first voltage, boost said first voltage to at least a minimal voltage said first voltage is less than said minimal voltage to output a second DC signal having said at least minimal voltage, and maintain said first voltage if said first voltage is greater than said minimal voltage to output said second DC signal having said first voltage; and
    a buck boost converter configured to receive said second DC signal, boost or limit a second voltage of said second DC signal to a desired voltage, and output said DC output having said desired voltage.

8. The meter electronics of claim 7 wherein said circuit further comprises:
    a transformer configured to provide a galvanic barrier between said buck boost converter and a signal conditioner.

9. The meter electronics of claim 8 wherein said circuit further comprises:
    an output rectifier configured to prevent the supply of excess current from said circuit.

10. The meter electronics of claim 9 wherein said circuit further comprises:
    an opto-coupled feedback connected to said output rectifier; and
    a buck boost feedback control configured to regulate current output from said buck boost converter.

11. The meter electronics of claim 7 wherein said circuit further comprises:
    control circuitry configured to maintain said at least minimal voltage of said second DC signal output by said boost converter.

12. The meter electronics of claim 11 wherein said circuit further comprises:
    start-up circuitry that is configured to regulate voltage applied to said control circuitry.

13. A Coriolis flowmeter having at least one conduit, a driver affixed to said at least one conduit to oscillate said at least one conduit, pick-off sensors affixed to said at least one conduit to measure oscillations of said conduit, and meter electronics that provide a signal to said driver to cause said driver to oscillate said at least one conduit, receive signals from said pick off sensors and determine properties of a material flow through said at least one conduit, said Coriolis flowmeter comprising:

a power supply configured to supply a direct current (DC) output to said meter electronics;

wherein said power supply comprises:

a rectifier configured to receive an alternating current (AC) input and convert said AC input to a first direct current (DC) signal, and receive a DC input and convert said DC input to said first DC signal having a desired polarity;

a boost converter configured to receive said first DC signal having a first voltage, boost said first voltage to at least a minimal voltage if said first voltage is less than said minimal voltage to output a second DC signal having said at least minimal voltage, and maintain said first voltage if said first voltage is greater than said minimal voltage to output said second DC signal having said first voltage; and a buck boost converter configured to receive said second DC signal, boost or limit a second voltage of said second DC signal to a desired voltage, and output said DC output having said desired voltage.

14. The Coriolis flowmeter of claim 13 further comprising:

a transformer of said power supply configured to provide a galvanic barrier between said buck boost converter and a signal conditioner.

15. The Coriolis flowmeter of claim 14 further comprising:

an output rectifier of said power supply configured to prevent excess current from said circuit.

16. The Coriolis flowmeter of claim 15 further comprising:

an opto-coupled feedback of said power supply connected to said output rectifier; and a buck boost feedback control configured to regulate current output from said buck boost converter.

17. The Coriolis flowmeter of claim 13 further comprising:

control circuitry configured to maintain said at least minimal voltage of said second DC signal output by said boost converter.

18. The Coriolis flowmeter of claim 17 further comprising:

start-up circuitry that is configured to regulate voltage applied to said control circuitry.

* * * * *

UNITED STATES PATENT AND TRADEMARK OFFICE
CERTIFICATE OF CORRECTION

PATENT NO. : 6,591,693 B1
DATED : July 15, 2003
INVENTOR(S) : William M. Mansfield and William Harris, Jr.

It is certified that error appears in the above-identified patent and that said Letters Patent is hereby corrected as shown below:

Column 1,
Lines 22-23, replace "electricity. The problem becomes exasperated when wiring in different facilities deliver electricity in different manners" with -- electricity. The problem becomes exacerbated when wiring in different facilities delivers electricity in different manners --
Line 30, replace "manufacture time as one power supply would be used for the" with -- manufacturing time as one power supply would be used for the --

Column 2,
Line 14, replace "power supply circuit must be placed in manufactured com-" with -- power supply circuit needs to be placed in manufactured com- --
Lines 16-17, replace "decreases the development time for a component as well as reducing the manufacturing costs of the component." with -- decreases the development time for a component and reduces the manufacturing costs of the component. --
Line 29, replace "tor called a buck boost convertor receives the DC current" with -- ter called a buck boost converter receives the DC current --
Line 33, replace "a galvanic barrier between the buck booster and a load. The" with -- a galvanic barrier between the buck boost converter and a load. The --
Line 40, replace "regulates current output from the buck-booster converter." with -- regulates current output from the buck boost converter. --
Line 42, replace "tains the at minimal output voltage of current output by the" with -- tains the at least minimal output voltage of current outputted by the --
Line 44, replace "circuitry regulates voltage applied to said control circuitry." with -- circuitry that regulates voltage applied to said control circuitry. --
Line 63, replace "in the world that the load is being sold." with -- in the world the load is being sold. --
Line 67, replace "a conventional rectifier that converts an AC current to DC" with -- a conventional rectifier that converts an AC current to a DC --

Column 3,
Lines 5-7, replace "Boost convertor 110 receives the DC current applied to path 103 and boosts the voltage of the DC current to at least a minimal value. Boost convertor 110 is a conventional" with -- Boost converter 110 receives the DC current applied to path 103 and boosts the voltage of the DC current to at least a minimal value. Boost converter 110 is a conventional --

UNITED STATES PATENT AND TRADEMARK OFFICE
CERTIFICATE OF CORRECTION

PATENT NO. : 6,591,693 B1
DATED : July 15, 2003
INVENTOR(S) : William M. Mansfield and William Harris, Jr.

It is certified that error appears in the above-identified patent and that said Letters Patent is hereby corrected as shown below:

Column 3 (cont'd),
Lines 11-16, replace "DC output from boost convertor 110 is applied to path 111. Buck boost convertor receives DC applied to path 111. Buck boost convertor receives the DC and either boosts the DC to a desired voltage or limits the DC to a desired voltage. Buck boost convertor 120 may be conventional SEPIC booster. DC with the desired voltage is then output over" with -- DC output from boost converter 110 is applied to path 111. Buck boost converter receives DC applied to path 111. Buck boost converter receives the DC and either boosts the DC to a desired voltage or limits the DC to a desired voltage. Buck boost converter 120 may be a conventional SEPIC booster. DC with the desired voltage is then outputed over --
Line 19, replace "booster conventor 120. The transformer 130 provides a" with -- boost converter 120. The transformer 130 provides a --
Line 31, replace "output from output rectifier/filter and applied to the load." with -- outputted from output rectifier/filter 140 and applied to the load. --
Line 33, replace "path 141. Optical coupled feedback 142 receives the DC" with -- path 141. Optical coupled feedback 142 receives DC --
Lines 37-39, replace "regulates the DC voltage of buck boost convertor 120 via path 122. Feedback control 115 is a conventional feedback loop circuit that receives DC output from boost convertor" with -- regulates the DC voltage of buck boost converter 120 via path 122. Feedback control 115 is a conventional feedback loop circuit that receives DC ouput from boost converter --
Lines 43-45, replace "Start-up bias circuitry limits voltage and current applied to control circuitry 115 and 123. When power is initially applied start-up bias circuitry allows only a controlled" with -- Start-up bias circuitry 105 limits voltage and current applied to control circuitry 115 and 123. When power is initially applied start-up bias circuitry 105 allows only a controlled --
Lines 51-52, replace "includes a flowmeter assembly 210 and meter electronics 250. Meter electronics 250 are connected to a meter assem-" with -- includes flowmeter assembly 210 and meter electronics 250. Meter electronics 250 are connected to flowmeter assem- --
Line 58, replace "be practiced in conjunction with any apparatus having loads" with -- be practiced in conjunction with any apparatus having loads that --

Column 5,
Line 35, replace "with this invention to provide DC current of a desire voltage" with -- with this invention to provide DC current of a desired voltage --

UNITED STATES PATENT AND TRADEMARK OFFICE
CERTIFICATE OF CORRECTION

PATENT NO. : 6,591,693 B1
DATED : July 15, 2003
INVENTOR(S) : William M. Mansfield and William Harris, Jr.

It is certified that error appears in the above-identified patent and that said Letters Patent is hereby corrected as shown below:

<u>Column 6,</u>
Line 27, replace "at least a minimal voltage said first voltage is less than" with
-- at least a minimal voltage if said first voltage is less than --

Signed and Sealed this

Thirteenth Day of April, 2004

JON W. DUDAS
*Acting Director of the United States Patent and Trademark Office*